United States Patent
DiToro

4,058,713
Nov. 15, 1977

[54] EQUALIZATION BY ADAPTIVE PROCESSING OPERATING IN THE FREQUENCY DOMAIN

[75] Inventor: Michael J. DiToro, Massapequa, N.Y.

[73] Assignee: General Signal Corporation, Rochester, N.Y.

[21] Appl. No.: 724,872

[22] Filed: Sept. 20, 1976

[51] Int. Cl.² .......................................... G06F 15/34
[52] U.S. Cl. ...................................... 364/724; 325/42; 328/167; 333/18; 333/28 R; 364/726
[58] Field of Search ............ 235/152, 156; 324/77 R, 324/77 B; 325/41, 42, 65, 473; 328/167; 333/18, 28 R, 70 T

[56] References Cited
U.S. PATENT DOCUMENTS

| | | | |
|---|---|---|---|
| 3,614,673 | 10/1971 | Kang et al. | 328/167 X |
| 3,656,108 | 4/1972 | Arbuckle et al. | 325/41 X |
| 3,864,632 | 2/1975 | Chang | 325/42 |
| 3,925,646 | 12/1975 | Richardson et al. | 235/152 |
| 3,973,112 | 8/1976 | Sloane | 324/77 B X |

*Primary Examiner*—Jerry Smith
*Attorney, Agent, or Firm*—Milton E. Kleinman; Stanley B. Green

[57] ABSTRACT

Equalization apparatus for a communication system transmitting through a time or frequency spread medium. The message to be transmitted is partitioned and transmitted in burst or frame by frame form. Each frame comprises the message (unknown at the receiver) followed by a test signal known at the receiver. Time gaps are provided between the message and test signals to avoid overlapping of the received message and test signals due to time-spreading. The received mutilated signals are processed in the frequency domain to obtain a reconstituted version of the transmitted message in the frequency domain. This is re-transformed into the time domain so that the reconstituted message available at the receiver is a close replica of the message which was originally available only at the transmitter.

26 Claims, 26 Drawing Figures

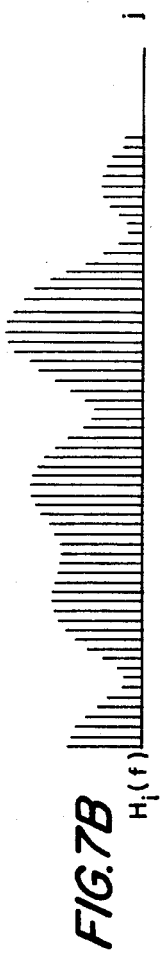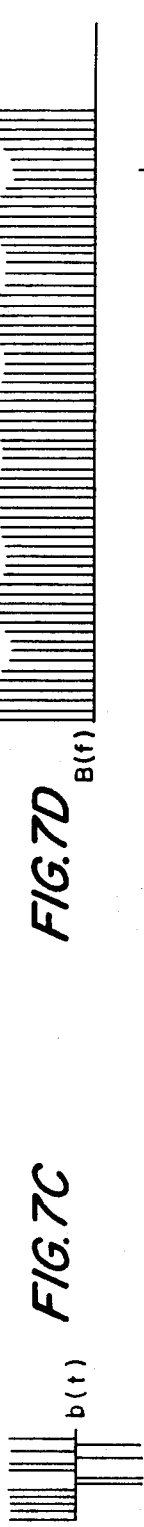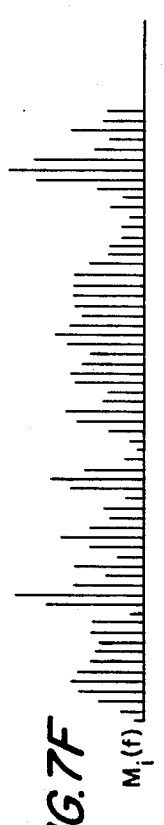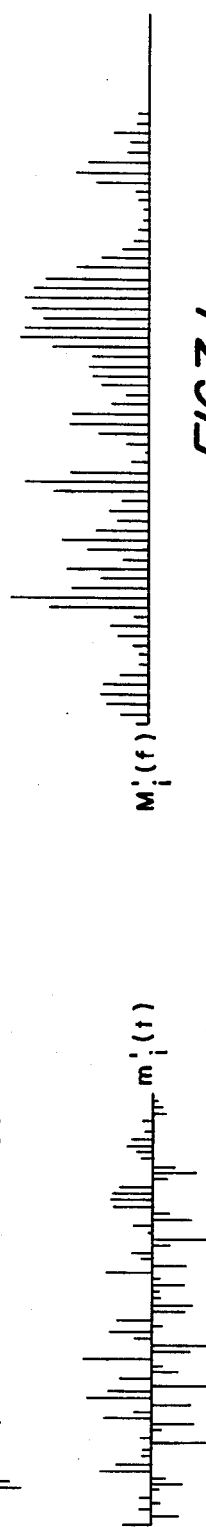
FIG.7A FIG.7B $H_i(f)$
FIG.7C $b(t)$ FIG.7D $B(f)$
FIG.7E $m_i(t)$ FIG.7F $M_i(f)$
FIG.7G $b'_i(t)$ FIG.7H $B'_i(f)$
FIG.7I $m'_i(t)$ FIG.7J $M'_i(f)$

FIG.7K
FIG.7M  m(k,j)
FIG.7L  $m'_i(t)$
FIG.7P  $m''_i(t)$
FIG.7O  $m'''_i(t)$
FIG.7N  $M''(f)$

EQUALIZATION BY ADAPTIVE PROCESSING OPERATING IN THE FREQUENCY DOMAIN

FIELD OF THE INVENTION

The present invention relates to communication systems, and more particularly, to improvements in such communication systems in which equalization is provided for the transmission function, by apparatus processing received signals in the frequency domain.

BACKGROUND OF THE INVENTION

Various forms of communication links exhibit time-frequency spread which can make it difficult to recover a transmitted message so as to make available at the receiver a faithful reproduction of the message which has been transmitted. Examples of such media are HF links via the earth-ionispheric duct, underwater sonic and earth seismic links, troposcatter VHF links, and to some lesser extent, voice-quality telephone lines. Transmission difficulties are caused by a number of effects, such as multi-path reception, group delay distortion or, in general, time-spread of the time response of the overall transmission system. In addition, there also occurs Doppler, time-jitter, time-variable frequency offset or, in general, frequency spread of the overall response of the transmission system.

In order to overcome the undesirable waveform linear distortions that these effects introduce into the received form of a communicated message, the prior art has primarily processed the received signal in the time domain (see e.g., "Communication in Time Frequency-Spread Media Using Adaptive Equalization" by M. J. DiToro, found in the *Proceedings of the IEEE*, Volume 56, Number 10, October 1968, pages 1653-79). The ultimate goal of the prior art techniques, which is in common with the goal of this invention, is to provide at the receiver a reconstituted message which faithfully reproduces the message which was made available to the transmitter for transmission purposes. The present invention seeks, however, in distinction to the prior art, to achieve this result by processing the received message in the frequency domain rather than by operating on the received message in the time domain.

Therefore, it is one object of the present invention to provide a communication system in which the received message is processed, in the frequency domain, so as to provide a faithful reproduction of the message which was made available to the transmitter. It is another object of the invention to provide apparatus for use at a receiving station, for processing the received message in the frequency domain, so as to make available faithful reproductions of the message that was actually transmitted. It is still another object of the present invention to provide apparatus as is set forth above, which takes into account, in the processing, noise which may be received along with the message so that the ultimate reconstructed message made available is only to a small degree contaminated by noise.

If the transmission medium transfer function were known, the transmitted message could be reconstituted at the receiver by a de-convolution process since the received message is the convolution of the transmitted message and the transmission medium impulse response function. De-convolution in the time domain is difficult to achieve. However, in the frequency domain de-convolution is more tractable and is done simply by division wherein the transmitted message can be obtained by dividing the Fourier transform coefficients of the received message by the Fourier coefficients of the medium transfer function. This is a much more tractable problem.

SUMMARY OF THE INVENTION

The present invention achieves the objects herein above set forth, as well as other objects of the invention, by transmitting a message signal in burst form interleaved with a known test signal, receiving the transmitted signals and converting them, along with the transmitted form of the known signal, to the frequency domain, processing all the signals converted to the frequency domain in order to produce a reconstituted version of the transmitted message signal, in the frequency domain and reconverting the reconstituted version of the transmitted message to the time domain.

To provide the receiver with a known test signal interleaved with the message signal, the transmitter is arranged to segregate, in the form of bursts, predetermined portions of the transmitted message. Each burst is transmitted separately at a slightly higher speed than the initial message speed so as to make available a time gap during which a burst comprising the known test signals is transmitted. The transmission of both the known test signals and the message signal is timed so that, at the receiver, overlap of the message and known signal, caused by time-spread, is avoided.

At the receiver, the received message and known test signal are converted into the frequency domain. Comparing the transmitted and received forms of the known signal enables the apparatus to obtain an estimate of the transfer function of the transmission media which can then be employed to develop the transmitted message signal. In the absence of noise the apparatus could then convert the processed signal into the time domain and then, employing known apparatus, coalesce the different disjointed bursts of the transmitted form of the message signal into a continuous signal. However, in order to cope with unavoidable noise added to the received message and known test signal, apparatus is provided to determine a measure of the noise contribution at the different frequencies. With this information, a dynamic weighting function is provided, as a function of frequency, which may be employed to modify the result of the previous processing. As modified, then, the apparatus converts the frequency domain version of the transmitted message signal into the time domain. At this point, the apparatus has available a plurality of time-spaced bursts of the estimate of the transmitted signal. From these time-spaced bursts, a continuous message is reconstituted which then faithfully corresponds to the form in which the message was made available for transmission purposes.

BRIEF DESCRIPTION OF THE DRAWINGS

The remaining portion of this specification will describe a preferred embodiment of the invention when read in conjunction with the attached drawings, in which like reference characters identify identical apparatus, and in which:

FIGS. 7A–7P are waveforms defining and illustrating the result from a simulation of the invention.

DETAILED DESCRIPTION OF A PREFERRED EMBODIMENT

In the general case of transmitting through a medium exhibiting both time-spread (or smearing) and frequency-spread (or time-variability) a transmitted signal undergoes a variety of impairments which can be characterized as:

1. dispersion, multi-path reception, group delay distortion, or, in general, time-spread of the response of the overall transmission system to a delta function in time; and, 2. doppler, time-jitter, time-variable frequency offset, or, in general, frequency spread of the response of the overall transmission system to a delta function in frequency, i.e., a CW signal.

Regardless of the specific type of modulation employed, the goal of the receiver is to process the received signal so that the information contained in the transmitted signal can be derived from the output of the receiver, i.e., the processed received signal. Examples of transmission media which exhibit the impairments referred to above are HF links via the earth-ionospheric duct, underwater sonic and earth seismic links, troposcatter VHF links, and, with less time variability, voice-quality telephone lines.

Figure 1A:
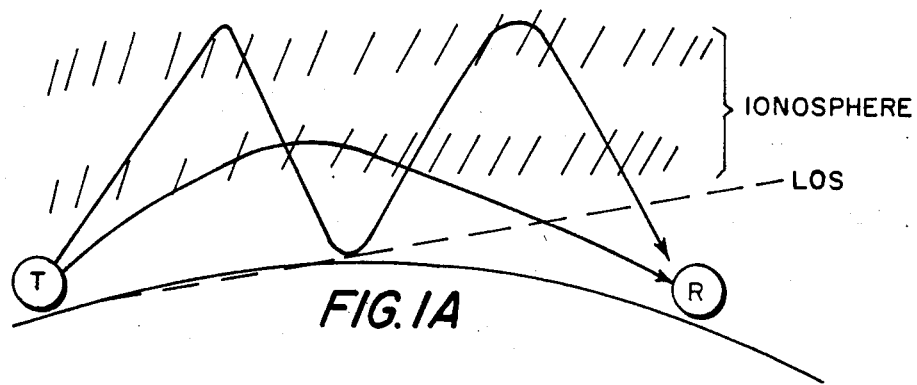
FIG. 1A is a diagramatic showing of one application of the invention.

FIG. 1A is a schematic representation of a multi-path HF ionospheric transmission system in which a transmitting station T transmits signals to a receiving station R, which is below the line of sight (LOS) from the transmitting station, via the ionospheric duct.

Figure 1B:
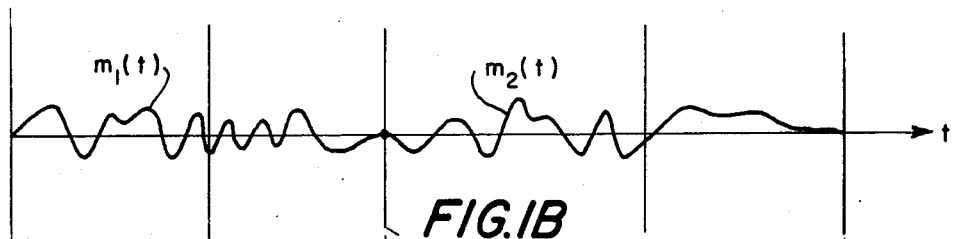
FIG. 1B is a representative waveform illustrating the message to transmitted.
Figure 1C:
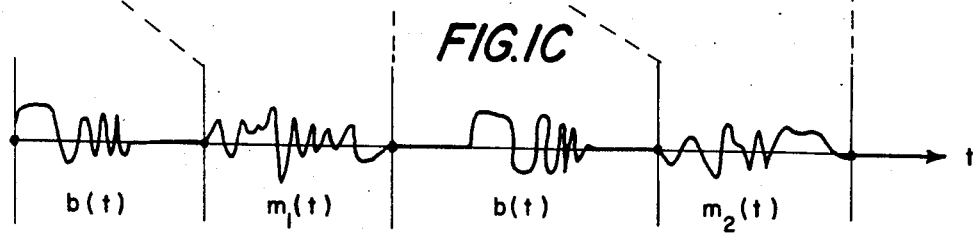
FIG. 1C is a segmented speeded-up message interleaved with the test signal in accordance with the preferred embodiment of the invention.

In the general case, the message $m(t)$ at terminal T is continuous as in FIG. 1B. This is segmented into a plurality of message bursts such as $m_1(t)$, $m_2(t)$, etc., as shown in FIG. 1C. Because the message burst is transmitted at a rate faster than the initial message $m(t)$ gaps are created between contiguous message bursts. Into these gaps a known test signal $b(t)$ is transmitted, that is, a signal which is known at the receiver. Although the known signal could be time-dependent, in the simplest case it is time invariant, and will be represented hereinafter as $b(t)$. In order to enable the receiver to readily distinguish a received version of the known test signal and the message signal, gaps (as in FIG. 1C) in the transmitted signal are provided between the message signal bursts and the known signal bursts so that notwithstanding the time-spread encountered in the transmission process, the bursts do not overlap in time at the receiver.

Figure 1D:
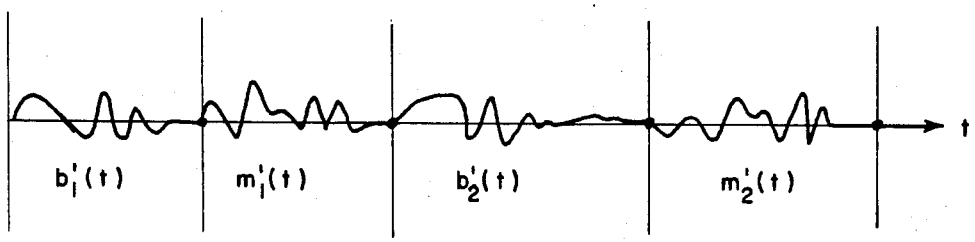
FIG. 1D is the result when the waveforms of FIG. 1C are transmitted through the medium.

At the receiver, this transmission sequence takes the form illustrated in FIG. 1D, wherein $b_1'(t)$, $b_2'(t)$, etc., represent different received smeared known signal bursts, $m_1'(t)$, $m_2'(t)$, etc., represent different received smeared message bursts. FIG. 1D illustrates that the signal sequences do not, in fact, overlap in time at the receiver.

If we assume that the transmission medium is time-invariant over a short period of time, or that it is slowly varying, then, in the frequency domain, we can write the following expressions:

$$B'(f) = H_i(f) B(f)$$

and $$M'(f) = H_i(f) M(f)$$

Capitalization, e.g., $H_i(f)$, indicates the Fourier coefficient of the corresponding lower case time waveform, e.g., $h_i(t)$. $B(f)$ refers to the (invariant) transmitted known signal while $B'(f)$ refers to the received known signal, $M(f)$ refers to the transmitted message signal burst and $M'(f)$ refers to the received form of the message signal.

In these expressions, the integer $i$ is the frame number, e.g., 1, 2, etc.

Substituting, in the second equation, the known terms of the first equation, we can thus write an expression in the frequency domain for the transmitted message signal as follows:

$$M''(f) = B(f) M'(f)/B'(f)$$

where the reconstructed $M''(f)$ is close to $M(f)$.

Based on the foregoing, then, the apparatus of the invention converts the time domain form of the received signals to frequency domain form and then obtains an estimate of the transmitted message in the frequency domain.

We have indicated that the foregoing is based on the assumption that the transmission media is slowly varying. This assumption depends, of course, to some extent, on the portion of the transmission spectrum which we are employing, as well as another factor which must be considered because the transfer function of the transmission media is being evaluated by the known signal at one time and the message signal is, of course, transmitted at some time later. I have found, however, that for HF transmission, adequate results are obtained if we send 10 to 20 frames per second where a frame is comprised of a known signal burst and a message signal burst. For purposes of maximizing through put, of course, it would be desirable to reduce the duration of the known signal burst to some minimum duration. On the other hand, in order to obtain an accurate estimate of the transmission media characteristic, the known signal should be sufficiently long to obtain a fairly precise estimate of the transmission media throughout the spectrum of interest.

The foregoing representation of the problem also ignores the effect of noise. More particularly, both the received message signal and the received known test signal include noise therein. In order to accurately process the received form of the message signal in order to generate or recreate the transmitted form of the message signal, some means must be provided to eliminate, from the received form of the message signal, that portion which arises from a noise source. Therefore, instead of the expression reproduced above, the apparatus of my invention employs the following expression:

$$M'_i(f) = G_o(f) [B(f)M''_i(f)/B'_i(f)]$$

In the foregoing expression, the parameters have their previously defined meaning, and the parameter $G_o(f)$ is a scalar multiplier to eliminate the effects of noise. Those skilled in the art will realize the quantities $M'_i(f)$, $B(f)$, $B'_i(f)$, $M''_i(f)$ are complex Fourier coefficient quantities having different values at each of a plurality of frequencies and that $G_o(f)$ is a different scalar quantity at each of a plurality of frequencies.

A preferred embodiment of the invention will now be disclosed with reference to FIGS. 2-6B.

Figure 2:
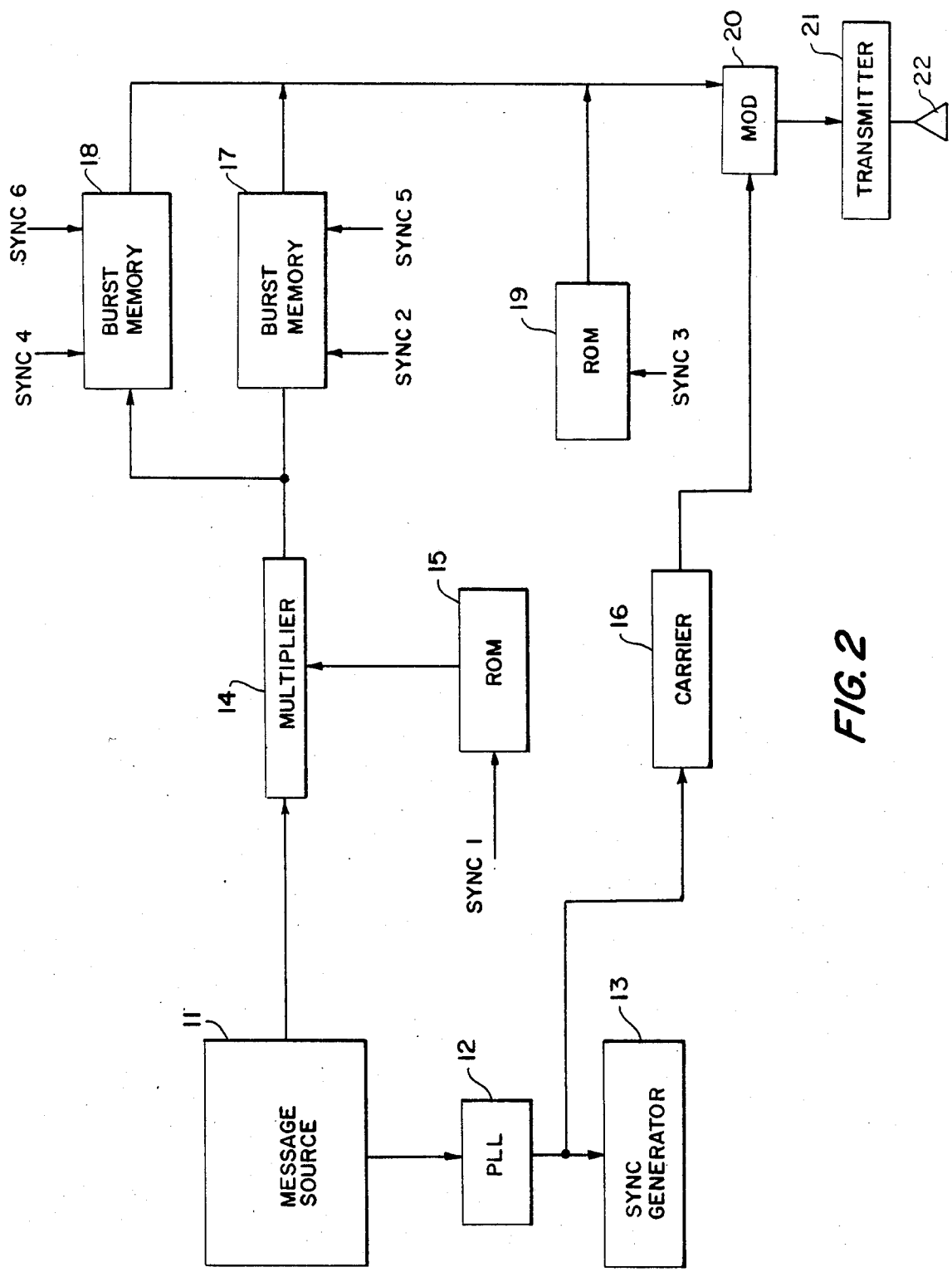
FIG. 2 is a block diagram of a transmitter which can be employed in a communication system employing the principles of the invention.

FIG. 2 is a block diagram of the apparatus at the transmitting station T, arranged to generate the signal sequence of FIG. 1C going to the RF transmitter. As is shown in FIG. 2, a message source 11 supplies signals to a multiplier 14, and a phase locked loop 12. The phase locked loop 12 provides timing information to a synchronizing generator 13, the outputs of which are supplied to access or address ROM's 15 and 19 as well as the RAM's identified as burst memories 17 and 18. The particular timing of these various sync outputs of sync generator 13 will be illustrated with reference to FIG. 3. The output of multiplier 14 is provided as an input to both burst memories 17 and 18. A carrier generator 16, synchronized to PLL 12, feeds a modulator 20, whose output is made available to an RF transmitter 21 for radiation via antenna 22. The other input to modulator 20 is derived from either burst memory 17 or 18 or ROM 19. Each of the foregoing structures are well known to those skilled in the art and a detailed disclosure thereof is not deemed necessary.

Message source 11 represents the source of message information which can comprise any message source (such as a telephone system) analog or digital, which supplies information in the form of a varying electrical signal. In the case of an analog message source, digitizing apparatus would be required so that the message is provided to the transmitting apparatus in pulse form. Preferably, these can be binary pulses employing binary signals in which a word of information is made up of a number of signals having one of two possible amplitudes. Phase locked loop 12 allows the synchronization generator 13 to be synchronized with the rate at which information is received from the message source 11, the reason for which will become clear hereinafter. As is shown in FIG. 1C, the incoming message will be transmitted in burst form, with the known signal transmitted in the gaps between different bursts of the message signal. In order to provide the gap, the message signal must be transmitted at a rate faster than it is received, and to form the message into separate bursts, random access memories 17 and 18 are provided. In order to provide for message randomization, however, the multiplier 14 multiplies the message, as it is received, by a pseudo-random sequence contained in ROM 15. As a message is received, and randomized, it is inserted into one or the other of burst memories 17 and 18. In the period of time when one memory is being written into, the other burst memory is read out and then the roles of the burst memories are interchanged. For example, if a message is being written into a burst memory 17, burst memory 18 will be read out at a higher rate than the rate at which the message is being received. When burst memory 17 is full, burst memory 18 will be empty, and the message is then written into burst memory 18, and burst memory 17 is read out. These operations occur under the control of the synchronizing generator 13 which produces the necessary synchronizing signals. For example, sync 2 and sync 4 enable writing into one or the other of the memories whereas syncs 5 and 6 enable reading from one or the other of the memories. After a message signal has been read out of a burst memory, either 17 or 18, the known signal must be transmitted. The known signal is contained in ROM 19, and readout of this memory is initiated by sync 3.

Figure 3:
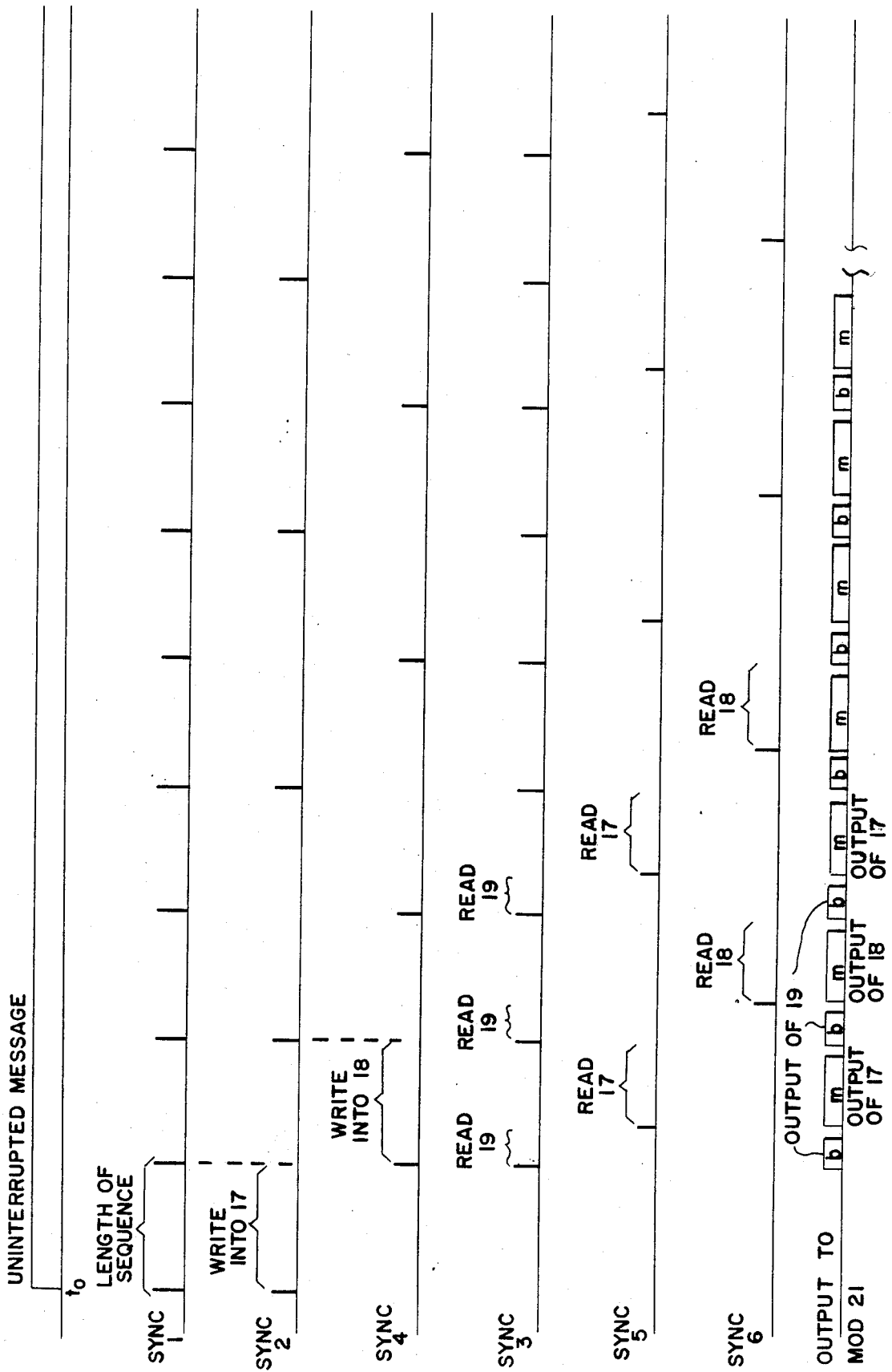
FIG. 3 is an exemplary timing diagram of some signals employed in the apparatus illustrated in FIG. 2.

FIG. 3 shows typical synchronizing sequence. For example, the first line of FIG. 3 indicates an uninterrupted digital message beginning at time to.

Contemporaneously with the beginning of the uninterrupted message, sync 1 initiates readout of ROM 15, the randomization code. FIG. 3 indicates the length of this sequence. Contemporaneous with the readout of ROM 15, synchronizing signal 2 enables the now randomized message output of multiplier 14 to be written into burst memory 17.

At the conclusion of the period during which memory 17 has a message signal written therein, sync 1 is again produced to again read out the sequence of ROM 15, only now, however, under the control of sync 4 the randomized output of multiplier 14 is written into memory 18. Substantially contemporaneous with sync 4, sync 3 is produced which enables readout of ROM 19. Stored in ROM 19 is a known sequence, which is hereinafter referred to as the known test signal or simply the known signal. Sync 3 enables the known signal to be read out of ROM 19 and made available to modulator 20 for transmission purposes. Thus, at the lowest line of FIG. 3, we see that the known signal $b(t)$ is provided to modulator 20. Shortly subsequent to the production of sync 3, at the conclusion of the known signal, sync 5 is produced which allows the message signal now stored in memory 17 to be read out.

It is significant that the writing and reading time is significantly different, implying that the message signal is read out at a rate faster than it is written. Thus, the output of memory 17 provides the message signal to the modulator 20. Subsequent to readout of memory 17, sync 2 is again produced so that the randomized message can now be written into the now empty memory 17. The sequence continues in this fashion so that alternate message bursts are provided by either memory 17 or 18, and these message bursts have located between them the outputs of ROM 19, the known signal.

In order to provide the receiver with signals which do not overlap in time, a hiatus is provided between termination of any known sequence and the beginning of the next message signal, as well as between the termination of any message signal and beginning of a known signal. The hiatus should be at least as long as the time spread to be encountered in the transmission medium. For example, for a transmitting and receiving pair which are separated by 3,000 kilometers, 5 msec., would be a suitable hiatus. As will be explained hereinafter it may be preferable to lengthen the hiatus for an additional millisecond to enable the receiver to measure the channel noise power in the absence of any signal. The reasons for this will become clear hereinafter.

In the foregoing fashion, the apparatus shown in block form in FIG. 2 produces a transmitted signal sequence as shown in FIG. 1C.

Figure 4:
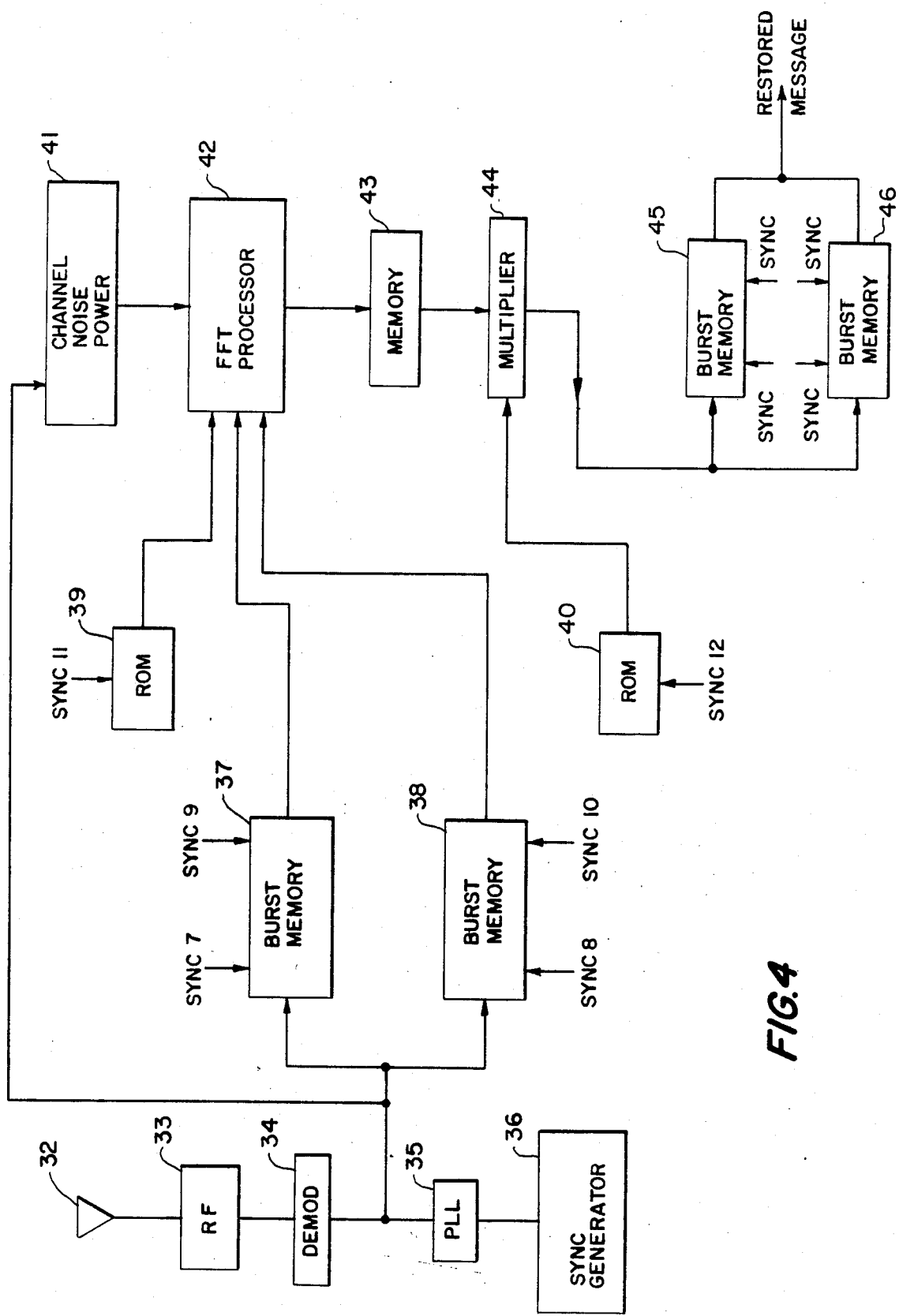
FIG. 4 is a block diagram of the apparatus at the receiver designed to apply the principles of the invention.

The block diagram of the receiver is shown in FIG. 4. As shown in this Figure, a radio frequency section 33 has the transmitted signal coupled thereto by means of an antenna 32. The signal is demodulated in demodulator 34 from which it drives a phase locked loop 35, the output of which drives a sync generator 36. Sync generator 36, as sync generator 13, develops synchronizing signals for routing the received signals to the appropriate location. More particularly, the output of demodulator 34 consists of the demodulated version of the message signal $m'_i(t)$, the demodulated version of a known signal $b'_i(t)$, with a small hiatus therebetween, followed by similar sequences. A pair of burst memories 37 and 38 have written therein, respectively, signals representing the received form of the known test and message signal, under control of outputs of the sync generator 36. At the appropriate time, the contents of the memories 37 and 38 are read out and made available to the FFT processor 42. In addition, the contents of ROM 39 can also be made available to the FFT processor 42, under the control of sync 11. Finally, the channel noise power, measured by conventional apparatus 41, is also made available to the FFT processor 42. The output of FFT processor 42 is coupled to a memory 43, which can actually comprise a shift register. The output of memory 43 is coupled to a multiplier 44, to which is also coupled the output of ROM 40, which has stored therein the same randomizing sequence as was stored in ROM 15 (see FIG. 2). The output of multiplier 44 is made available to one of two random access memories 45 and 46 under control of appropriate synchronizing signals. Each of the memories stored a derandomized reconstituted version of the transmitted form of the message burst. The memories are alternately written into and read out of, so that the signal sequence available at the output of memories 45 and 46 is the restored message, i.e., a de-bursting or continuous output is provided.

Figure 5:
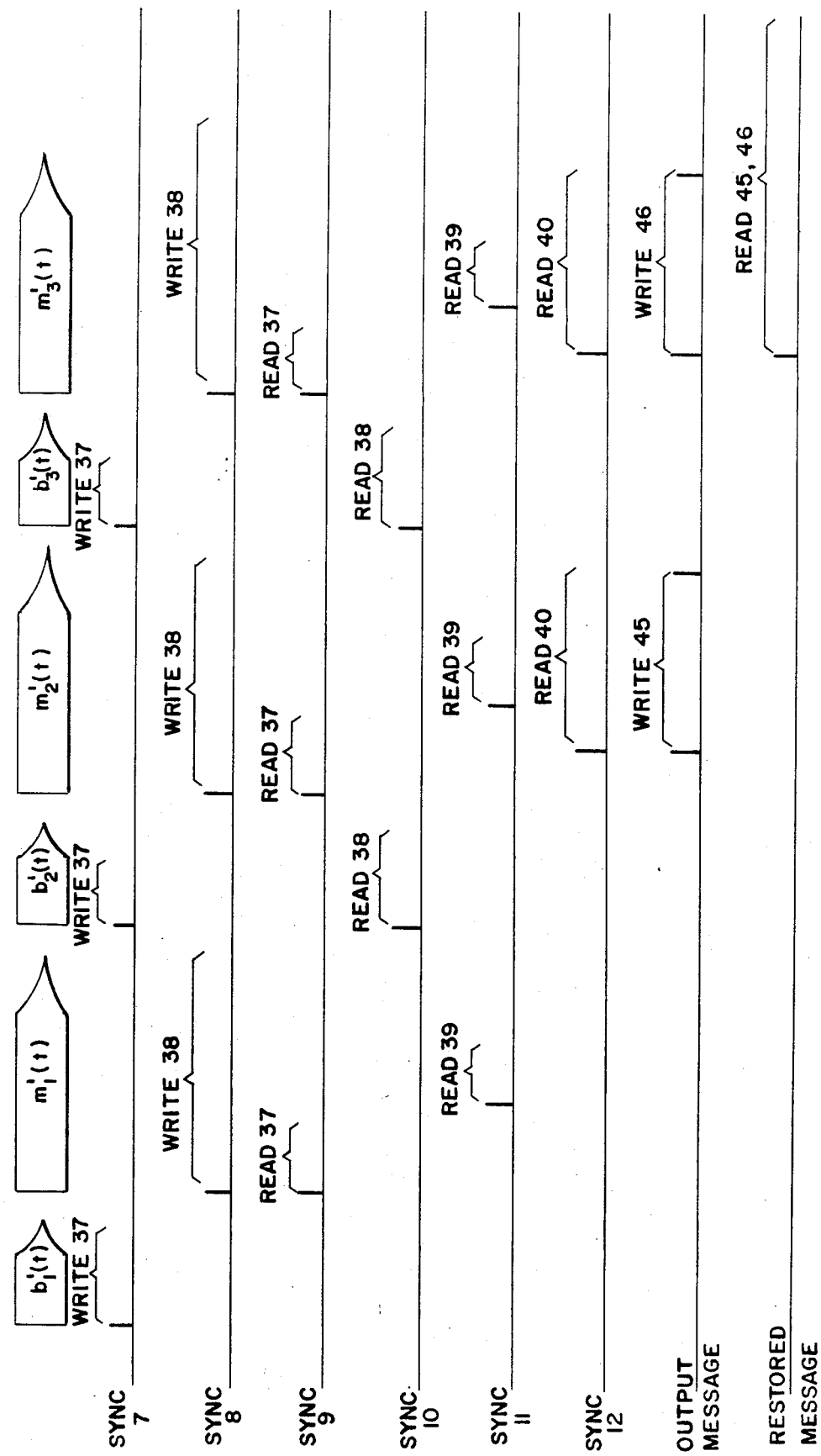
FIG. 5 is an exemplary timing diagram showing several of the signals developed in the apparatus of FIG. 4.

FIG. 5 illustrates some of the timing signals and other outputs at various portions of the receiving apparatus. More particularly, the uppermost line in FIG. 5 illustrates the output of demodulator 34 showing both the received known signal and message signals, in burst form. Sync 7 allows the received known signal to be written into memory 37, whereas sync 8 allows the received message signal to be written into memory 38. Contemporaneous with the writing process of memory 38, the contents of memory 37 are made available, as a consequence of sync 9, to the FFT processor 42. Sync 11, which is produced at a time subsequent to sync 9, makes available to the FFT processor 42 the contents of ROM 39, which contains the transmitted form of the known signal. Subsequently, sync 10 allows the contents of memory 38, containing the received form of the message signal to also be made available to FFT processor 42. As is shown in FIG. 5, the sequence continues, that is, after readout of memory 37, sync 7 allows the subsequent received form of the known signal to be written therein and the sequence continues. At some point subsequent to the production of sync 10, the FFT processor 42 makes available to memory 43 the randomized estimate of the transmitted form of the message signal. This is derandomized via multiplier 44, under control of sync 12. A typical derandomized sequence is then written into memory 45, for instance. The next subsequent output of the FFT processor, after derandomization, is written into burst memory 46. The sync signals then allow the outputs of memories 45 and 46 to be read out, at a slower rate than they are written into, so as to provide a continuous form of signal.

The processing carried out by FFT processor 42, employing the received forms of the known signal and message signal, along with the transmitted form of the known signal will now be described with reference to FIG. 6A and 6B.

Figure 6A:
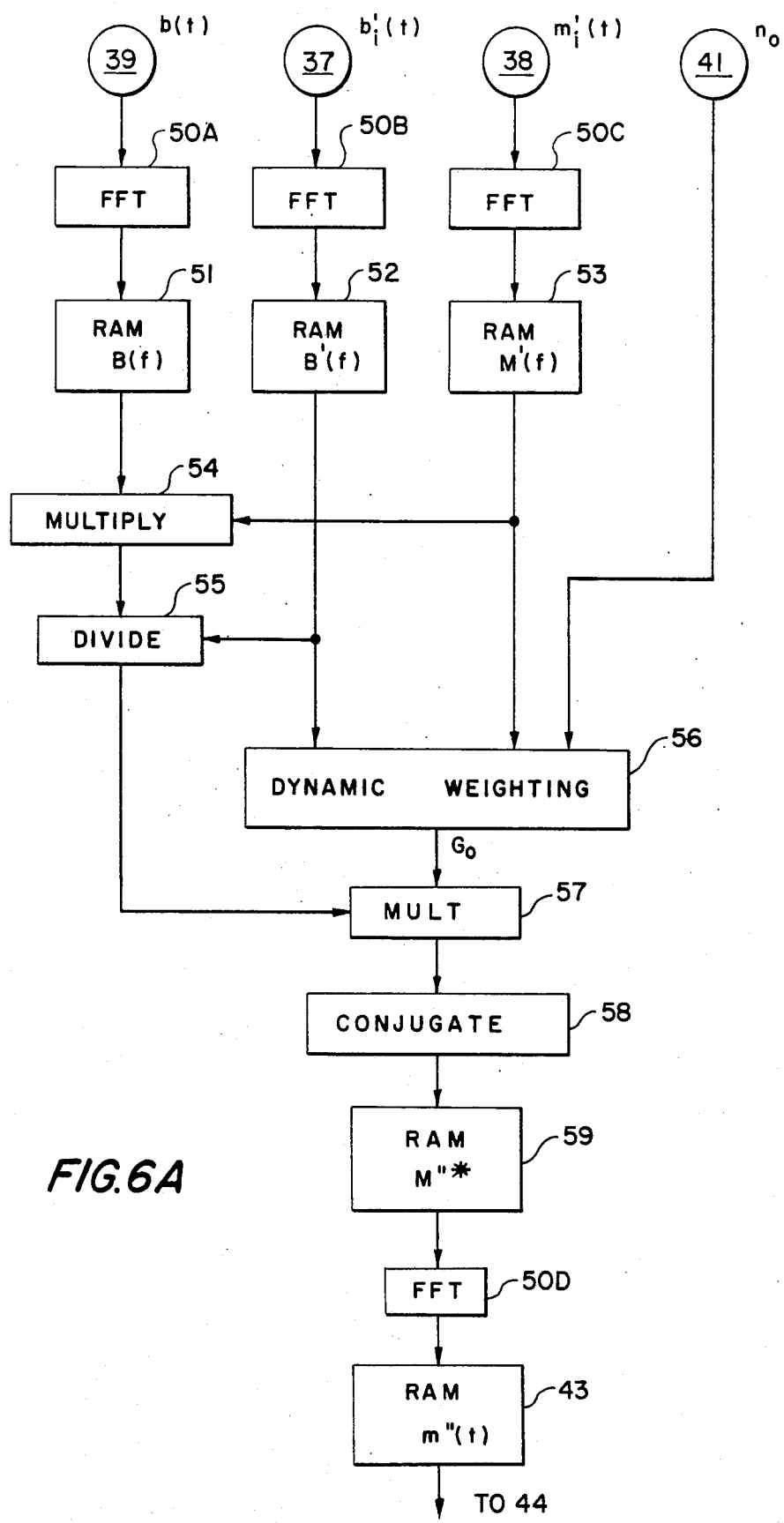
FIGS. 6A and 6B comprise a functional block diagram illustrating the processing carried out by the FFT processor, shown in block form in FIG. 4.
Figure 6B:
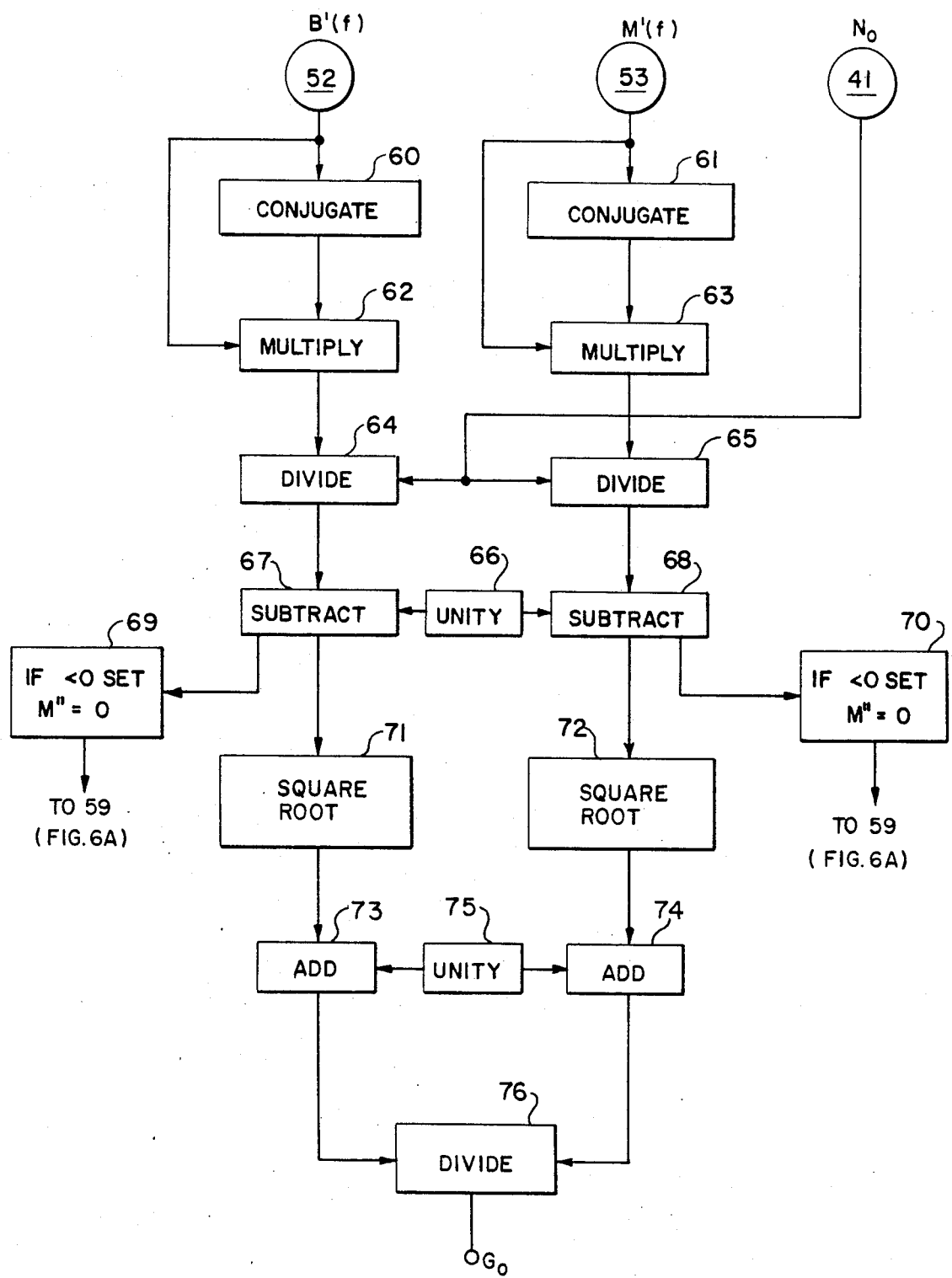

FFT processor 42 may be implemented by means of a general purpose digital computer operating under a program which will be apparent from a review of FIGS. 6A and 6B, along with the associated portions of the specification. Alternatively, special purpose apparatus can be provided which is designed to carry out the functions of FIGS. 6A and 6B. Those skilled in the art will readily understand how such apparatus is to be constructed. A number of elements in the processing are employed a plurality of times, and for this reason it is preferable (although not necessary) to "time-share" this apparatus. For example, reference to FIGS. 6A and 6B indicates that Fast Fourier Transform function is required in four instances, multiplication is required in four instances, and division is required in four instances. Thus, instead of providing a different apparatus to perform each of these functions, for example, one Fast Fourier Transfer circuit could be enabled to perform each of the Fast Fourier Transform operations by time-sharing that apparatus.

As shown in FIG. 6A (wherein the circled reference numerals indicate that the associated signals come from the apparatus identified by that reference numeral), the transmitted form of the known signal is converted to the frequency domain by FFT unit 50A, and stored in a memory 51. The FFT 50A thus responds to $b(t)$ and produces $B_i(f)$ which is stored in memory 51. In a similar fashion, the received form of the known signal is converted to the frequency domain and stored in a random access memory 53. That is, $b'_i(t)$ is converted to $B'_i(f)$ and stored in memory 53. Employing the convention that capitalized letters represent frequency domain function (Fourier coefficients) and the primed parameters refer to the received form of the signal, the memories 51, 52 and 53 store respectively $B(f)$, $B'_i(f)$ and $M'_i(f)$. The length of each of these sequences depends in part on the precision to which the apparatus must be held and also determines, of course, the size of the associated memories. Typically, for a message burst of 64 bits, 128 complex Fourier coefficients would be sufficient. Those skilled in the art will realize that the foregoing is exemplary and can be varied to suit different requirements of accuracy.

In any event, multiplying apparatus 54 provides the product $B(f)M'_i(f)$ and divider 55 produces the result $B(f)M'_i(f)/B'_i(f)$. In line with the theoretical discussion above, in the absence of noise, this is the frequency domain form of the apparatus' estimate of transmitted message. In order to correct for the presence of noise, however, the quantity $G_o(f)$ is provided by the dynamic weighting apparatus 56. This factor is multiplied by the previously computed quantity in multiplier 57. The result is a quantity $M''(f)$ corresponding to the Fourier coefficients of the apparatus' estimate of the transmitted message signal. Preparatory to obtaining the time domain form thereof, the conjugate is obtained in apparatus 58 and the results stored in memory 59. Fast Fourier Transform apparatus 50D obtains the inverse Fourier Transform thereof, $m''(t)$, and stores the result in memory 43 (corresponding to that memory in FIG. 4).

FIG. 6B illustrates, in detail, the functions performed by the dynamic weighting apparatus 56. More particularly, signal sequences are made available to the apparatus of FIG. 6B, corresponding to the quantities $B'(f)$, $M'(f)$ and the receiver noise power $N_o$. The dynamic weighting function $G_o(f)$ is generated to correct the estimate of the message signal provided by divider 55 for the presence of noise. The apparatus compares the power spectra of the received form of the known and message signals with the noise power, at each of a plurality of different frequencies (corresponding to different Fourier coefficients). If noise power in a certain frequency band exceeds the power of the associated Fourier coefficient of either the received form of the known test signal or the message signal, the corresponding Fourier coefficient in the estimate of the message signal is set to zero. That is, the quantity $KN_o$ is compared with $|B'_{ij}|^2$ and $|M'_{ij}|^2$, wherein $i$ designates the frame and $j$ designates the frequency band with which the Fourier coefficient is associated. If $kN_o$ is greater than $|B'_{ij}|^2$ or $|M'_{ij}|^2$ then the associated estimate $M''_{ij}$ is set to zero. Although I have referred to apparatus in which $k = 1$, this is not necessarily an optimum. I have employed $k = \frac{1}{2}$ in tests. The exact quantity $k$ is best determined empirically. If the power of both the received form of the known signal and the message signal exceed the noise power, then a ratio is taken to derive the quantity $G_o$, and this ratio is employed to reduce the Fourier coefficient of the estimate of the message signal provided by the divider 55.

As shown in FIG. 6B, the Fourier Transform of both the received form of the known and message signals are provided respectively to conjugate apparatus 60 and 61. Each Fourier coefficient can be though of as a complex number or vector. A conjugate apparatus (such as 60 or 61) reverses the polarity of the imaginary portion of the vector and provides the result to a multiplying apparatus 62 and 63. The multiplying apparatus multiplies the complex number and its conjugate to obtain a quantity related to the power of the signal at the associated frequency. Dividers 64 and 65 then divide the noise power by either the received form of the known signal power or the received form of the message power. The resulting ratios $N_o/|B'_{ij}|^2$ and $N_o/|M'_{ij}|^2$ are coupled to subtractors 67 and 68. These subtractors are also provided with a signal corresponding to unity by ROM unit 66. If the result produced by subtractor 67 or 68 is less than zero, then function 69 or 70 sets the associated frequency parameter for the estimate of the transmitted message signal ($M''_{ij}$) to zero. In other words, if the noise power exceeds either the power of the received form of the known signal or the message signal, then the apparatus recognizes it cannot provide an accurate estimate of what the original message was, at that frequency component, and therefore sets it to zero. In line with the preceding discussion, it may be preferable to generate the ratios $kN_o/|B'_{ij}|^2$ and $kN_o/|M'_{ij}|^2$ or some monotonic function thereof and compare the ratios with unity to determine if $kN_o$ is greater than $|B'_{ij}|^2$ or $|M'_{ij}|^2$, where $k$ is empirically determined. Assuming, however, that the difference is greater than 0, then units 71 and 72 provide the square root of the results to the adders 73 and 74, respectively. Also provided to each of adders 73 and 74 is a signal corresponding to unity. The result, respectively, $1 + \sqrt{1 - N_o/|B'_{ij}|^2}$, and $1 + \sqrt{1 - N_o/|M'_{ij}|^2}$ are provided to divider 76 which forms a ratio corresponding to $G_o$. For each frequency component or Fourier coefficient, the dynamic weighting factor is computed and is multiplied with the associated frequency component of the Fourier coefficient provided by the divider 55 in the multiplier 57. The output of multiplier 57 is a signal train comprising a series of complex numbers comprising the Fourier coefficient of the estimate of the transmitted message, corrected by the dynamic weighting factor $G_o$, in order to take into account the inaccuracies produced by noise. The conjugate apparatus 58, like that apparatus 60 and 61, provides the conjugate of the complex number which is then stored in a random access memory 59. The Fast Fourier Transform unit 50D takes the inverse Fourier Transform and stores it in a random access memory 43. The signal stored in memory 43 $m''_i(t)$ is a time domain signal comprising the apparatus' estimate of the originally transmitted message signal, corresponding to the burst message which has now been processed.

As is mentioned above, the remaining apparatus comprising multiplier 44 and memories 45 and 46 serve to derandomize the message estimate and to de-burst the form of it so as to produce, at the output, the restored message in the form in which it was originally transmitted.

FIGS. 7A–7P illustrate the product of a simulation of the foregoing apparatus to demonstrate the effectiveness of the processing. FIG. 7A is the simulated time domain impulse response of the transmission medium clearly illustrating multi-path reception. The Fourier coefficient magnitudes of this is illustrated in FIG. 7B and illustrates that certain portions of the spectrum have faded as a result of multi-path transmission. Of course, the transmitting and receiving apparatus has no way, a priori, of determining these parameters. For simplicity of illustration, only the magnitudes of the Fourier coefficients are shown in the spectra; it should be kept in mind, nevertheless, that these Fourier coefficients are complex quantities.

FIGS. 7C and 7D illustrate, respectively, the time sequence of the known test signal and the Fourier coefficient magnitudes thereof. The known signal is taken, for example, as the 13 bit Barker Code 1111100110101. Particularly noteworthy is the fairly constant amplitude spread of the spectrum of this known test signal. FIG. 7E illustrates the transmitted message signal (although not used in the processing above, it is instructive to see FIG. 7F which is the Fourier coefficient thereof).

FIGS. 7G and 7H are, respectively, the received smeared known test signal and the Fourier coefficients thereof. Comparing FIGS. 7G and 7C, the considerable distortion and smearing introduced as a result of transmission is readily apparent. For this simulation, the channel signal to noise ratio for both the known signal and the message signal were taken as 15DB. The received form of the message signal is shown in FIG. 7I, and its Fourier coefficient is shown in FIG. 7J. Comparing FIGS. 7E and 7I, readily points out the substantial distortion in the message introduced through transmission.

FIG. 7K illustrates the needed mutiplicative processing done on FIG. 7J in accordance with this invention to obtain FIG. 7N which is the Fourier coefficient of the receiver's estimate of the originally transmitted message $M''(f)$. Taking the inverse Fourier Transform produces the time domain signal shown in FIG. 7O. After peak-peak clipping and expanding the message for comparison purposes, the result is the sequence illustrated in FIG. 7P. Comparing the sequence illustrated in FIG. 7P with the originally transmitted message, the sequence of which is illustrated in FIG. 7M, indicates that no errors have been made in transmission. For comparison, FIG. 7L illustrates the output of the receiver where no signal processing is carried out in accordance with this invention. The small dashes in the lower portion of FIG. 7L illustrate bit errors that have been made by the receiver, an error being whenever the signals in FIG. 7M and 7L are different. The five bit errors in the approximately 50 transmitted bit message represents a system bit error of 0.1 which, for practical purposes, is useless as a communication system.

In the foregoing description the processor has relied on a comparison between the received form of the known signal and the transmitted form of the known signal to arrive at an estimate of the effect of the transmission medium on the transmitted signal so as to restore the received form of the transmitted signal to its original transmitted form. Since the apparatus employs only a single transmission channel, and since only one of the known or message signals can be transmitted at any one time, there is some inherent time delay between the transmission of the known and message signals which may result in some error due to changes in the transmission media. One way to minimize this error is to transmit the known signal sufficiently often to minimize changes in the transmission media between different known signal bursts. Increasing the rate of transmission of the known signal, of course, reduces the throughput, and therefore the efficiency of the communications system, since the goal of the communication system is the transmission of message signals and not known signals. One variant of the invention which can be employed to reduce the effect of the delay between transmission of the known and message signals, while at the same time maintaining reasonable throughput, is to estimate the characteristics of the transmission medium based upon comparisons between received and transmitted known tests signal both preceding and subsequent to transmission of the message signal. Where the estimates of the transmission media vary due to changes in the relationship between the received and transmitted forms of the known signal, the estimates will be weighted in favor of the relationship closer in time. For example, at the beginning portion of a message signal, the relationship between the received and transmitted forms of the known signal preceding the message signal would be weighted more than the relationship between the received and transmitted form of the known signal subsequent to the message. Likewise, for the portions of the message past its midpoint, the relationship between the received and transmitted forms of the known signals subsequent to the message would be weighted in favor of the relationship between the received and transmitted forms of the known signals prior to the message. Modification of the apparatus disclosed herein to employ this variant will be apparent to those skilled in the art. More particularly, it will only be necessary to retain the estimate of the transmitted message until after the succeeding known signal is received and the relationship between it and its transmitted form is determined before finalizing the estimate of the transmitted message.

Mention has been made of the criteria for selecting the hiatus between the termination of the transmitted known and message signal and the beginning of the next transmitted signal, either message or known, for the purpose of preventing overlap in these signals as received. In order to measure the noise power, however, it is preferable to have a hiatus in the signal at the receiver. To this end, therefore, a further small hiatus can be developed at the transmitter for this purpose. If desired, of course, the measurement of the noise power could be synchronized, at the receiver, to enable the measurement at the time when the hiatus is expected.

The FFT process can be carried out with commercially available equipment. The output of such unit is a pulse train corresponding to different Fourier coefficients of different frequency terms of the transform. The equations and functions disclosed above are applicable, of course, only to corresponding terms of different transforms. Multiplying $B_iM'_i$, for instance, requires multiplying corresponding coefficients only. That is, the expression is the sum of $B_{ij}M'_{ij}$ for all $j$. Effecting this is well within ordinary skill of the programmer or signal processing circuit designer. Accordingly, the details of such apparatus need not be disclosed. Apparatus to produce the conjugate of a vector quantity, and for multiplying, dividing, adding and subtracting are functions also well within the skill of the routineer.

FIG. 4 also illustrates ROM 39 which stores, as described in the specification, the transmitted form of the known test signal, $b(t)$. The specification describes that FFT 42 derives $B(f)$ from this sequence for processing each message burst. Inasmuch as this is an invariant factor, however, it is within the invention to delete ROM 39 and provide another ROM to replace RAM 51 (see FIG. 6A). The ROM substituted for RAM 51 will contain B(f) and supply this to the multiplier function 54 whenever required.

What is claimed is:

1. A signal processor for processing a message signal received over a time-spread or frequency-spread medium to produce an estimate of the transmitted message signal in which a known signal is transmitted along with said message signal and received therewith, comprising:
    a. first means for converting all said received signals to the frequency domain;
    b. second means for providing a representation of said known signal;
    c. processing means responsive to said first and second means to produce an estimate of the transmitted message signal in the frequency domain; and,
    d. third means for converting the frequency domain form of the estimate of said transmitted message signal to the time domain.

2. The apparatus of claim 1 wherein said second means provides a time domain representation of said known test signal and said processing means includes means to produce a frequency domain form of said known test signal.

3. The apparatus of claim 1 wherein said second means provides a frequency domain representation of said known test signal.

4. The apparatus of claim 1 in which said first means responds to said received message signal $m'(t)$ and known test signal $b'(t)$ to produce corresponding frequency domain form $M'_i(f)$ and $B'(f)$ and said processing means provides $B(f)M'_i(f)/B'(f)$ wherein $B(f)$ is the frequency domain form of said known test signal.

5. The apparatus of claim 4 which includes means for determining channel noise powder and said processing means multiplies the quantity $B(f)M'_i(f)/B'(f)$ by a noise related quantity.

6. The apparatus of claim 5 including means for providing $kN_o$ wherein $\frac{1}{2} > K > 2$ and $N_o$ is said channel noise power.

7. The apparatus of claim 6 which includes means for separately comparing received known and received message signal power in a plurality of frequency bands with said quantity $kN_o$ and for reducing, to zero, a received message signal in any frequency band if, for that band, $kN_o$ is greater than either received known or received message signal power.

8. The apparatus of claim 1 in which said first means produces a transform $B'_i(f)$ for said received known signal $b'(t)$ and a transform $M'_i(f)$ for said received message signal $m'(t)$, each transform comprising a series of Fourier coefficients related to the contribution to the associated signal in a different frequency band, said processing means producing a further transform related to the transmitted message signal and comprising a series of Fourier coefficients, by computing $$M''_i(f) = M'_i(f)B(f)/B'_i(f)$$

means for detecting channel noise power $N_o$, and producing a signal $kN_o$, means for comparing $kN_o$ with $|B'_i|^2$ and $|M'_i|^2$ in each said frequency band and for reducing the associated Fourier coefficient of $M''$ to zero if $kN_o > |B'_i|^2$ or $kN_o > |M'_i|^2$.

9. The apparatus of claim 8 wherein $\frac{1}{4} < k < 2$.

10. The apparatus of claim 8 in which said processing means further includes fourth means for multiplying the product $B(f)M'_i(f)/B'_i(f)$ by $G_o$ wherein $G_o$ is a noise related parameter.

11. The apparatus of claim 10 wherein said fourth means includes means for computing $$G_o = \frac{1 + \sqrt{1 - \frac{kN_o}{B'^2_i}}}{1 + \sqrt{1 - \frac{kN_o}{|M'_i|^2}}}$$

12. A communications system for communicating message signals from a transmitting station to a geographically remote receiving station over a time-spread or frequency-spread medium including:
transmitting apparatus, at said transmitting station, responsive to a message signal to transmit the same interleaved with a known signal.
receiving apparatus at said geographically remote receiving station responsive to the received form of said message signal and said known signal, to provide an estimate of the transmitted form of said message signal, said receiving apparatus including:
 a. means for converting all said received signals to the frequency domain;
 b. second means for providing a representation of said known test signal;
 c. processing means responsive to said first and second means to produce an estimate of the transmitted message signal in the frequency domain; and,
 d. third means for converting the frequency domain form of the estimate of said transmitted message signal to the time domain.

13. The apparatus of claim 12 wherein said second means provides a time domain representation of said known test signal and said processing means includes means to produce a frequency domain form of said known test signal.

14. The apparatus of claim 12 wherein said second means provides a frequency domain representation of said known test signal to said processing means.

15. The apparatus of claim 12 in which said first means responds to said received message signal $m'_i(t)$ and known test signal $b'_i(t)$ to produce corresponding frequency domain form $M'_i(f)$ and $B'_i(f)$ and said processing means provides $B(f)M'_i(f)/B'_i(f)$ wherein $B(f)$ is the frequency domain form of said known test signal.

16. The apparatus of claim 15 which includes means for determining channel noise power and said processing means multiplies the quantity $B(f)M'_i(f)/B'_i(f)$ by a noise related quantity.

17. The apparatus of claim 16 including means for providing $kN_o$ wherein $\frac{1}{4} < k < 2$ and $N_o$ is said channel noise power.

18. The apparatus of claim 17 which includes means for separately comparing received known and received message signal power in each said frequency band with said quantity $kN_o$ and for reducing, to zero, a received message signal in any frequency band if, for that band, $kN_o$ is greater than either received known or received message signal power.

19. The apparatus of claim 12 in which said first means produces a transform $B'_i(f)$ of said received known signal $b'_i(t)$ and a transform $M'_i(f)$ for said received message signal $m'_i(t)$, each transform comprising a series of Fourier coefficients related to the contribution to the associated signal in a different frequency band, said processing means producing a further transform related to the transmitted message signal and comprising a series of Fourier coefficients by computing $M''_i(f) = M'_i(f)B(f)/B'_i(f)$,
means for detecting channel noise power $N_o$, and producing a signal $kN_o$.
means for comparing $kN_o$ with $|B'_i|^2$ and $|M'_i|^2$ in each said frequency band and for reducing the associated Fourier coefficient of $M''_i$ to zero if $kN_o$ is greater than $|B'_i|^2$ or $|M'_i|^2$.

20. The apparatus of claim 19 in which $\frac{1}{4} < k < 2$.

21. The apparatus of claim 19 in which said processing means further includes fourth means for multiplying the product $B(f)M'_i(f)/B'_i(f)$ by $G_o$ wherein $G_o$ is a noise related parameter.

22. The apparatus of claim 21 wherein said fourth means includes means for computing $$G_o = \frac{1 + \sqrt{1 - \frac{kN_o}{|B'_i|^2}}}{1 + \sqrt{1 - \frac{kN_o}{|M'_i|^2}}}$$

23. The apparatus of claim 12 in which said transmitting means transmits a known signal having a substantially flat frequency spectrum throughout a frequency band of interest.

24. The apparatus of claim 12 in which said transmitter transmits in burst form and interleaves a known signal burst within each pair of message bursts.

25. The apparatus of claim 24 in which said known signal has a substantially flat frequency spectrum.

26. The apparatus of claim 25 in which said known signal comprises a pulse sequence 1111100110101.

* * * * *